US005531457A

United States Patent [19]

Tibbott et al.

[11] Patent Number: 5,531,457

[45] Date of Patent: Jul. 2, 1996

[54] GAS TURBINE ENGINE FEATHER SEAL ARRANGEMENT

[75] Inventors: Ian Tibbott, Montarville; Roger Gates, Montreal, both of Canada

[73] Assignee: Pratt & Whitney Canada, Inc., Longueuil, Canada

[21] Appl. No.: 350,567

[22] Filed: Dec. 7, 1994

[51] Int. Cl.[6] .............................. F16J 15/447; F01D 9/04

[52] U.S. Cl. ......................... 277/53; 277/167.5; 415/115; 415/139

[58] Field of Search .................................... 415/134, 135, 415/136, 137, 138, 139, 115, 116, 117, 191; 277/178, 184, 167.5, 53

[56] References Cited

U.S. PATENT DOCUMENTS

| | | | |
|---|---|---|---|
| 3,728,041 | 4/1973 | Bertelson | 415/139 |
| 3,752,598 | 8/1973 | Bowers et al. | 415/115 |
| 4,465,284 | 8/1984 | Szema | 277/53 |
| 4,767,260 | 8/1988 | Clevenger et al. | 415/115 |
| 5,167,485 | 12/1992 | Starkweather | 415/115 |
| 5,221,096 | 6/1993 | Heldreth et al. | 277/227 |
| 5,374,161 | 12/1994 | Kelch et al. | 415/116 |

*Primary Examiner*—William A. Cuchlinski
*Assistant Examiner*—John L. Beres
*Attorney, Agent, or Firm*—Edward L. Kochey, Jr.; Jeffrey W. Astle

[57] ABSTRACT

Adjacent platforms (16) have feather seals (34) in complementary slots (22). Hot grooves (40) carry cooling air across the seal and discharge it into the gap (20) between adjacent platforms. Grooves discharging from abutting surfaces are staggered and have a flow component parallel to the axial gas flow through the turbine.

8 Claims, 1 Drawing Sheet fig. 1
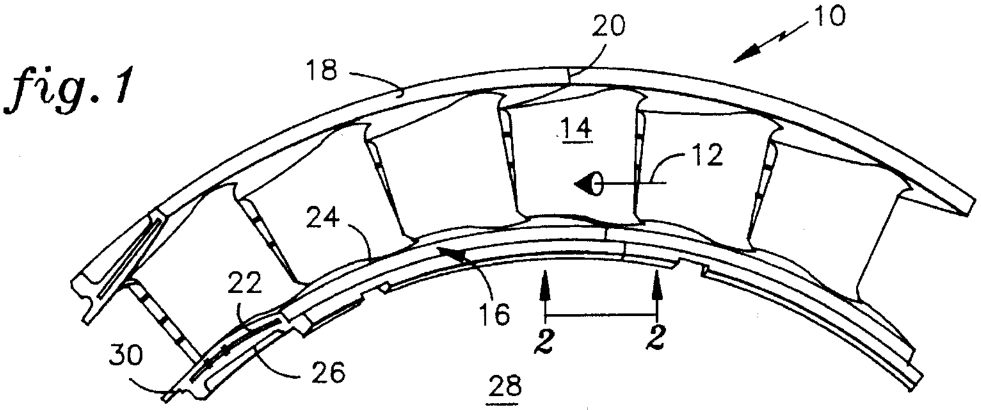
fig. 2
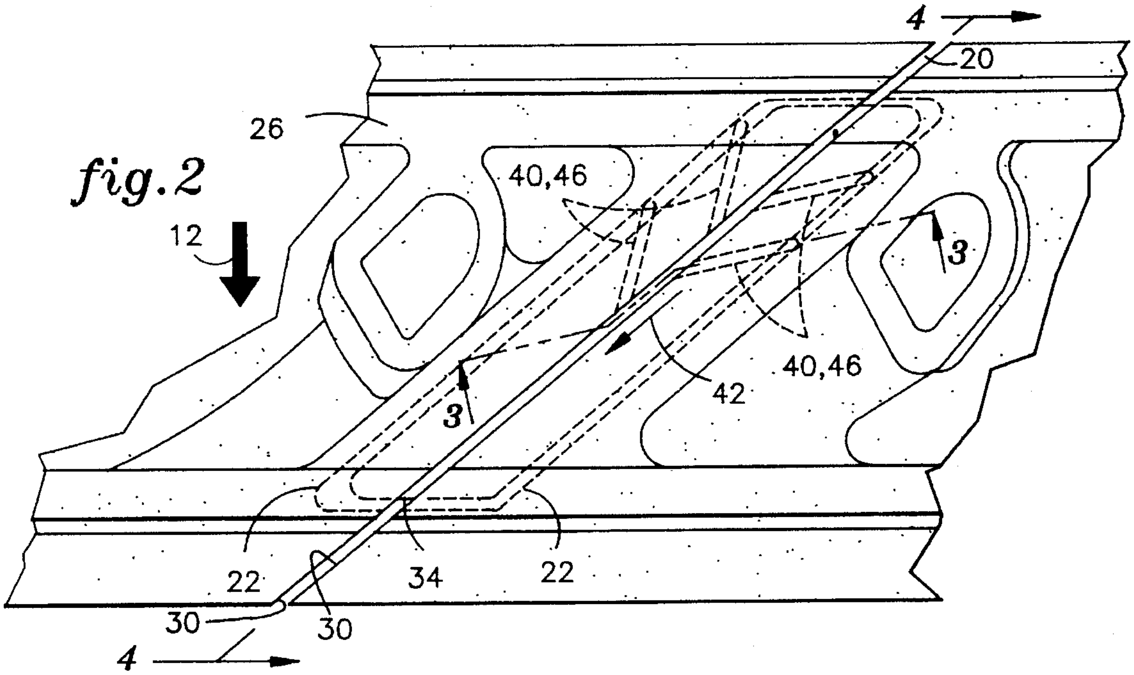
fig. 3
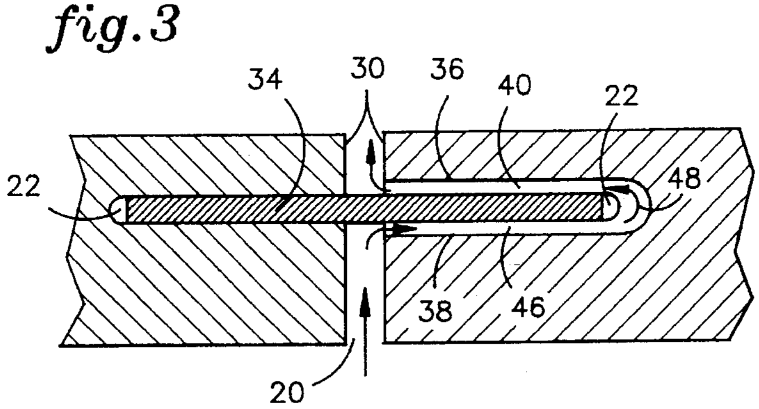
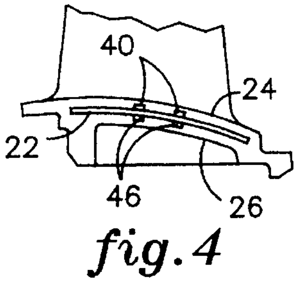
fig. 4

GAS TURBINE ENGINE FEATHER SEAL ARRANGEMENT

TECHNICAL FIELD

The invention relates to high temperature gas turbine engines and in particular to the cooling of arcuate segments such as vane platforms, shroud segments or rotor blades, adjacent the feather seals.

BACKGROUND OF THE INVENTION

Gas turbine engines are designed and operated at extremely high temperatures for the purpose of maximizing the efficiency. Such high temperatures pushes the materials used to the limits. Optimum operation and design is achieved with selective cooling of the various components.

High pressure air from the compressor is used and selectively directed through various components. The use of such cooling air bypasses the combustor and has a negative effect on gas turbine efficiency. Therefore it is desirable to achieve the required cooling with the minimum use of cooling air.

There are locations where a plurality of arcuate segments are used to define the gas flow path. The vane platforms is one such example. These vane platform segments must be segmented rather than being a single circle to permit differential expansion.

These segments are cooled by impinging cool air on the cold side of the segments. Where the segments join, it is conventional to cut a slot in each segment and place a thin metal feather seal in these slots between the two segments. The slot which accepts the feather seal breaks the heat flow path from the inside surface of the segment to the cooled outer side. Accordingly the segment is not sufficiently cooled at this feather seal location.

Various designs are known to selectively allow cooling flow through this area of the feather seal for the purpose of cooling the feather seal itself and the surrounding material of the segments.

It is desirable to achieve this cooling with the minimum negative effect on the gas turbine efficiency.

SUMMARY OF THE INVENTION

A plurality of circumferentially arranged adjacent segments such as vane platforms have one surface in contact with the hot gas flow. The opposite surface is in contact with the supply of cool air. Each segment also has two side surfaces abutting adjacent segments with a gap therebetween.

Complimentary slots in each side surface of the adjacent segments are supplied to accept a feather seal fitting into these slots. Each slot has a hot side surface toward the hot gas side and a cold side surface away from the hot gas side.

There are a plurality of hot grooves in the hot side surfaces, which pass cooling air, with each hot groove discharging into the gap at a staggered location with respect to the grooves discharging from the abutting surface of the adjacent segment. This provides a more uniform purging of the gap and additional cooling of the adjacent segment by the cooling air discharging against it.

Each groove discharges into the gap with a component parallel to the axial gas flow through the turbine, thereby providing a smooth flow of transition and less negative effect on the efficiency.

Preferably there are also located a plurality of grooves in each cold side surface which are in fluid communication with the grooves on the hot side surface. Radial misalignment between adjacent segments can not thereby cause a blockage of flow by the feather seal against an edge of the slot.

Furthermore, it is preferred that each groove has an angle of less than 45° from the direction of the gap so that there is a long length or high $L/_D$ to the groove, providing increased convection cooling as the cooling air passes through the groove.

BRIEF DESCRIPTION OF THE DRAWINGS

FIG. 1 is an axial view of several adjacent vane segments;

FIG. 2 is a view of a location where two adjacent vane segments abut one another, looking from the inside radially out;

FIG. 3 is a view through section 3—3 of FIG. 2; and

FIG. 4 is a view through section 4—4 of FIG. 2.

DESCRIPTION OF THE PREFERRED EMBODIMENT

FIG. 1 shows a portion of a gas turbine engine 10 within axial flow of gas 12 therethrough. This gas passes through a plurality of vanes 14. A plurality of these vanes are carried on an inner segment or blade platform 16 and an outer segment 18. These blade supports are segmented to permit relative expansion during operation.

These segments abut one another with gap 20 therebetween. Each segment has a slot 22 therein for the purpose of receiving a feather seal which is a thin flexible metal sheet (not shown in this figure). Each segment has a first surface 24 in contact with the hot gas flow 12. It has an opposite surface 26 in contact with a supply of cool air 28. Each segment also has two side surfaces 30 which abut one another with gap 20 therebetween.

Referring to FIG. 2 each side surface 30 has a slot 22 therein with feather seal 34 fitting within the slot. As seen in FIG. 3 each slot has a hot side surface 36 and a cold side surface 38. Grooves 40 are located in the hot side surface with the component of the discharge from the grooves in the direction of the axial flow 12 through the turbine. This flow discharges from the grooves into gap 20 purging the gap and making a smooth entrance into the hot gas flow. It is also noted that these grooves 40 are at an angle less than 45° from the direction 42 of the gap, which produces a relatively long length of groove 40 or a high $L/_D$ ratio. This provides for a more significant convective cooling of the material as the cooling air passes air through.

A plurality of grooves 46 are located in the cold side surface and these are in fluid communication at bend location 48 with the hot side grooves. Should the platforms become radially misaligned the feather seal 34 could pinch at corner 50 blocking the flow (FIG. 3). These grooves 46 prevent such blockage of the flowpath.

The material between the feather seal and the hot gas is cooled in an efficient manner. Impingement of the exiting flow against a platform between it's own cooling slot increases the effectiveness of the cooling. The component of discharge flow parallel to the axial turbine flow decreases the energy loss.

We claim:

1. In a gas turbine engine having an axial gas flow therethrough:

a plurality of circumferentially adjacent segments, each segment having a first surface in contact with hot gas flow and an opposite surface in contact with a supply of cool air, each segment having two side surfaces, each side surface abutting a side surface of an adjacent segment leaving a gap between abutting segments, each side surface having a slot complementary to the slot in the side surface of the adjacent segment, each said slot having a hot side surface and a cold side surface;

a feather seal fitting into said slots between adjacent segments; and a plurality of hot grooves in each hot side surface of said slots, each hot groove being in fluid contact with said supply of cool air, each hot groove having an opening into said gap which is staggered with respect to hot groove openings in adjacent segments so that, in use, each hot groove discharges cooling air into said gap at a location that is staggered with respect to the air that is discharged from hot grooves in the adjacent segment.

2. An apparatus as claimed in claim 1 wherein each groove has a component parallel to said axial gas flow.

3. An apparatus as claimed in claim 1, also comprising:

a plurality of grooves in each cold side surface, each in fluid flow communication with a hot groove in said hot side surface.

4. An apparatus as claimed in claim 1, wherein each hot groove is at an angle less than 45° from the direction of said gap.

5. An apparatus as claimed in claim 2, also comprising:

a plurality of grooves in each cold side surface, each in fluid flow communication with a hot groove in said hot side surface.

6. An apparatus as claimed in claim 2, wherein each hot groove is at an angle less than 45° from the direction of said gap.

7. An apparatus as claimed in claim 3, wherein each hot groove is at an angle less than 45° from the direction of said gap.

8. An apparatus as claimed in claim 5, wherein each hot groove is at an angle less than 45° from the direction of said gap.

* * * * *